United States Patent [19]

Jertson

[11] Patent Number: 5,121,592
[45] Date of Patent: Jun. 16, 1992

[54] POWERED SWEEPER/CHOPPER STRIKER ASSEMBLY FOR COLLECTING AND CHOPPING MATERIALS LIKE LEAVES FROM THE GROUND

[76] Inventor: John T. Jertson, 9437 Sagewood Dr., Roscoe, Ill. 61073

[21] Appl. No.: 715,986

[22] Filed: Jun. 17, 1991

[51] Int. Cl.$^5$ .................. A01D 51/00; A01D 57/12; A01G 1/12; E01H 15/00
[52] U.S. Cl. ........................... 56/344; 15/79.2; 15/179; 15/183; 56/199; 56/400.02; 56/400.11
[58] Field of Search ............ 56/12.4, 12.5, 344, 56/362, 364, 400.01, 400.02, 400.11, 400.12, 199, 202; 15/83, 79.2, 179, 183, 91

[56] References Cited

U.S. PATENT DOCUMENTS

| | | |
|---|---|---|
| 496,220 | 4/1983 | Gibbs . |
| 1,263,255 | 4/1918 | Kohler ................. 56/400.16 |
| 1,911,535 | 5/1933 | Schultze ............... 56/400.02 |
| 1,942,629 | 1/1934 | Withington ........... 56/400.17 |
| 2,033,451 | 3/1936 | Rose .................... 56/400.16 |
| 2,100,138 | 11/1937 | Heldt ................... 15/179 |
| 2,319,985 | 5/1943 | Genasci ................ 15/91 |
| 2,546,620 | 3/1951 | Van Ness .............. 15/83 X |
| 2,561,754 | 7/1951 | Propheter ............. 56/400.02 |
| 2,713,241 | 7/1955 | West .................... 56/400.02 |
| 2,723,494 | 11/1955 | Parker et al. ......... 15/79.2 X |
| 2,826,034 | 3/1958 | Feuerlein .............. 56/400.02 |
| 2,964,896 | 12/1960 | Finocchiaro ......... 15/83 X |
| 2,998,690 | 9/1961 | Ferris . |
| 3,102,376 | 9/1963 | Henderson ........... 56/294 |
| 3,460,629 | 8/1969 | Shapland, Jr. et al. . |
| 3,512,345 | 5/1970 | Smith . |
| 3,789,590 | 2/1974 | Wilson ................. 56/344 X |
| 3,995,415 | 12/1976 | Hoffmann ............. 56/364 |
| 4,446,681 | 5/1984 | Dynie et al. ......... 56/364 X |
| 4,601,163 | 7/1986 | Trelford ............... 56/362 X |
| 4,778,012 | 10/1988 | Kobashi et al. ....... 56/11.2 |
| 4,802,536 | 2/1989 | O'Neal .................. 56/16.9 |

FOREIGN PATENT DOCUMENTS

| | | |
|---|---|---|
| 174763 | 5/1953 | Fed. Rep. of Germany . |
| 875585 | 5/1953 | Fed. Rep. of Germany . |
| 1928406 | 12/1970 | Fed. Rep. of Germany . |
| 109413 | 3/1925 | Switzerland . |
| 878169 | 9/1961 | United Kingdom . |

OTHER PUBLICATIONS

Consumer Reports, Jun. 1991, pp. 414–418, Chipper/Shredders: Wood Processors.
John Deere Publication entitled "Forage Express, Faster from Field to Silo" (1989).

Primary Examiner—George A. Suchfield
Attorney, Agent, or Firm—Fuller, Ryan, Hohenfeldt & Kees

[57] ABSTRACT

A powered striker assembly for collecting loose material on the ground has a shaft mounted for rotation about a horizontal axis at a predetermined distance above the ground. The shaft carries an array of striker members. The striker members preferably comprise elastic nonrigid bodies. In the absence of shaft rotation, the elastic nonrigid bodies of the striker members are normally flexed out of a perpendicular relationship with the ground. In response to centrifugal force generated by rotation of the shaft, the flexed striker bodies mutually assume a perpendicular relationship with the ground for contacting and thrusting loose material. In one arrangement, the striker bodies are bent upon themselves in a U-shape and inserted through holes in the shaft, where they remain without use of external fasteners or the like.

38 Claims, 7 Drawing Sheets

FIG. 8
LOAD

FIG. 9
RECYCLE

POWERED SWEEPER/CHOPPER STRIKER ASSEMBLY FOR COLLECTING AND CHOPPING MATERIALS LIKE LEAVES FROM THE GROUND

FIELD OF THE INVENTION

My invention generally relates to powered devices for collecting loose materials like leaves from the ground. In a more particular sense, my invention relates to powered devices that employ an array of rotating tines or strikers for picking up leaves from the ground.

BACKGROUND OF THE INVENTION

Collecting fallen leaves is an unwelcomed yearly task for many people in the United States. Many types and styles of handheld, ambulatory, and power driven rakes have been developed to ease the burden.

The following documents show representative manual and ambulatory leaf raking devices that were in existence before my invention:

Manual Rakes:
  Gibbs U.S. Pat. No. 496,220
  Kohler U.S. Pat. No. 1,263,255
  Withington U.S. Pat. No. 1,942,629
  Swiss Patentschrift 109,413
Ambulatory Rakes:
  Schultze U.S. Pat. No. 1,911,535
  Rose U.S. Pat. No. 2,033,451
  U.K. Patent Specification 878,169

The following documents show representative power driven rakes and the like that use arrays of rotating tines or strikers:

Propheter U.S. Pat. No. 2,561,754
  West U.S. Pat. No. 2,713,241
  Ferris U.S Pat. No. 2,998,690
  Henderson U.S. Pat. No. 3,102,376
  Shapland U.S Pat. No. 3,460,629
  Smith U.S. Pat. No. 3,512,345
  Kobashi et al. U.S. Pat. No. 4,778,012
  O'Neal U.S. Pat. No. 4,802,536
  German Patentschrift 174,763
  German Patentschrift 875,585

Ambulatory and power driven rakes of the past use rotating tines to sweep up leaves much like automated brooms. They serve their purpose when the leaves are dry and confined to small areas. Still, picking up a large amount of dry leaves with the ambulatory or powered rakes of the past required frequent stops to empty the collected leaves. This is because the rakes did little to chop the leaves to reduce their volume during collection.

When the leaves are wet and matted, the sweeping efficiency of the rakes of the past suffers considerably. The difficulty of collection is further compounded when there is a large area to be raked. Collection becomes burdensome and extremely tiresome under these circumstances, even using powered rakes. Our environment also challenges us to find better ways to dispose of our leaves. Space for dumping leaves in public landfills and refuse collection sites is scarce. Therefore, it is becoming increasingly important to break collected leaves down to reduce their bulk. Many municipalities already altogether prohibit the dumping of leaves in public areas. There will soon come a day when all individuals must dispose of leaves on their own.

There is a need for a power rake that simplifies the yearly burden of collecting and disposing of leaves.

SUMMARY OF THE INVENTION

My invention meets this and other needs. My invention provides a powered sweeper/chopper striker assembly for collecting loose materials like leaves off the ground in a way that combines ease of use and maintenance with efficiency in operation. The powered striker assembly that incorporates the features of my invention also addresses the environmental concerns of the future: it not only collects leaves from the ground, but it also chops them into small pieces for collection and disposal in an environmentally conscious manner.

In a preferred embodiment, the striker assembly includes a shaft mounted for rotation about a horizontal axis. The shaft carries an array of nonrigid, lightweight striker members. The nonrigid striker members are normally randomly flexed out of a perpendicular relationship with the ground. Yet, in response to centrifugal force generated by rotation of the shaft, the flexed striker members straighten out and assume a unified, generally perpendicular working relationship with the ground. In this working relationship, the nonrigid striker members contact and thrust loose material up from the ground in a very efficient and effective manner. Due to their light weight, the striker assembly can be rotated at high speeds approaching and exceeding 3000 RPM. At these high speeds, the striker members also serve to vigorously chop material into smaller pieces and thrust them off the ground for collection and disposal.

In the preferred embodiment, the striker members are spaced at intervals both along and about the axis of rotation. In use, the spaced striker members thrust the material from the ground, deflecting it either upwardly, or off to one side, or in both directions. The axial and arcuate spacing of the striker bodies assures repeated strikes in rapid succession. Very effective pick up and chopping of the material results, particularly at the high speeds of rotation that my invention allows.

Another aspect of my invention provides a striker assembly on which the striker bodies are fastened without using external fasteners and the like. Ease of maintenance and repair result. The lack of external fasteners also contributes to the overall lightweight design of my striker assembly, through which high speeds of rotation can be achieved.

In a preferred embodiment, the striker assembly includes a shaft through which adjacent pairs of holes are drilled. The holes are aligned along the axis of rotation of the shaft. Each striker member is bent upon itself into a U-shape and passed through adjacent holes to form a striker unit comprising two striker bodies. The striker members can be easily inserted and removed by the user, without the use of tools, fasteners, and the like. Still, when the shaft is rotated, centrifugal force holds the striker body securely in place. High rotational speeds enhance the effect: the higher the speed of rotation, the higher the centrifugal force holding the striker body in place.

In the preferred embodiment, the striker bodies are nonrigid and elastic. The elastic memory of the bent striker body also serves to additionally secure the striker body in place in the shaft.

The striker assemblies that embody the features of my invention can be part of a wheeled device for collecting fallen leaves. The device includes an onboard power source for rotating the striker assembly, preferably at the high speeds of rotation at which the benefits of my invention are fully achieved. The device also preferably includes an onboard chamber for collecting the leaves thrusted and chopped by the striker assembly.

Other features and benefits of my invention will become apparent upon review of the following drawings, description, and appended claims.

DESCRIPTION OF THE PREFERRED EMBODIMENTS

Figures 1, 2:
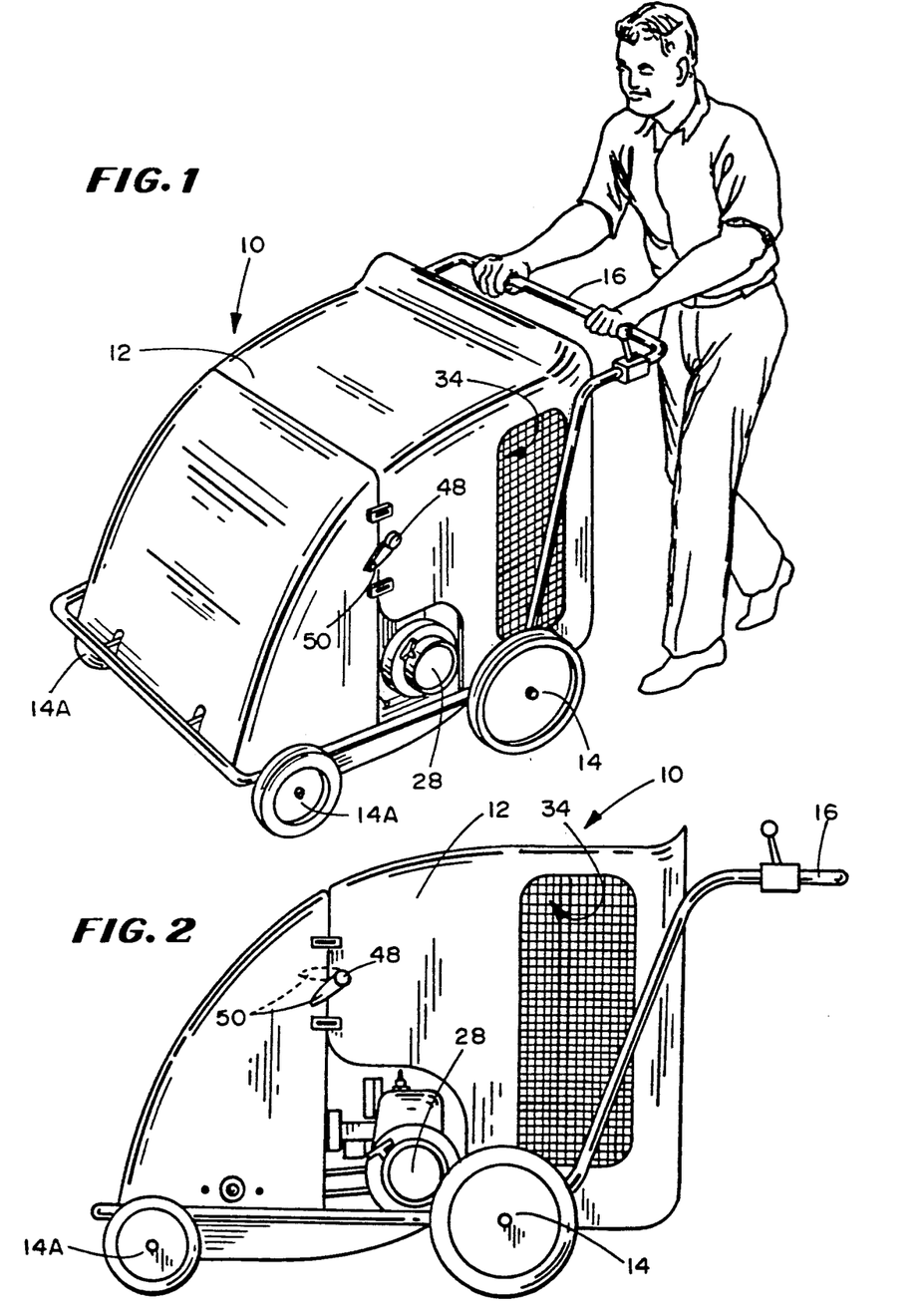
FIG. 1 is a perspective view of a device having a powered striker assembly that embodies the features of my invention.
FIG. 2 is a side elevation view of the device shown in FIG. 1.

FIGS. 1 and 2 show a device 10 for collecting materials from the ground that incorporates the features of my invention. The device 10 includes a housing 12 that rests on wheels 14 and 14A for movement along the ground. Preferably, wheels 14A are height adjustable. A rear handle 16 allows the user to push and steer the device (as FIG. 1 shows). The housing 12 is preferably made of a durable but lightweight formed plastic material.

Figure 3:
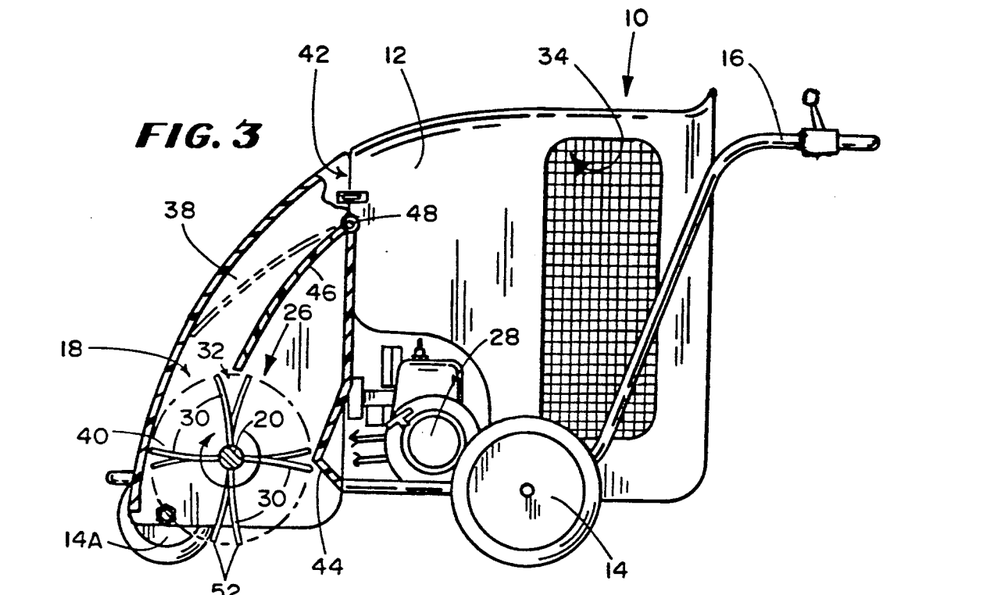
FIG. 3 is a side elevation view of the device shown in FIG. 1, with portions broken away to expose the interior.
Figure 4:
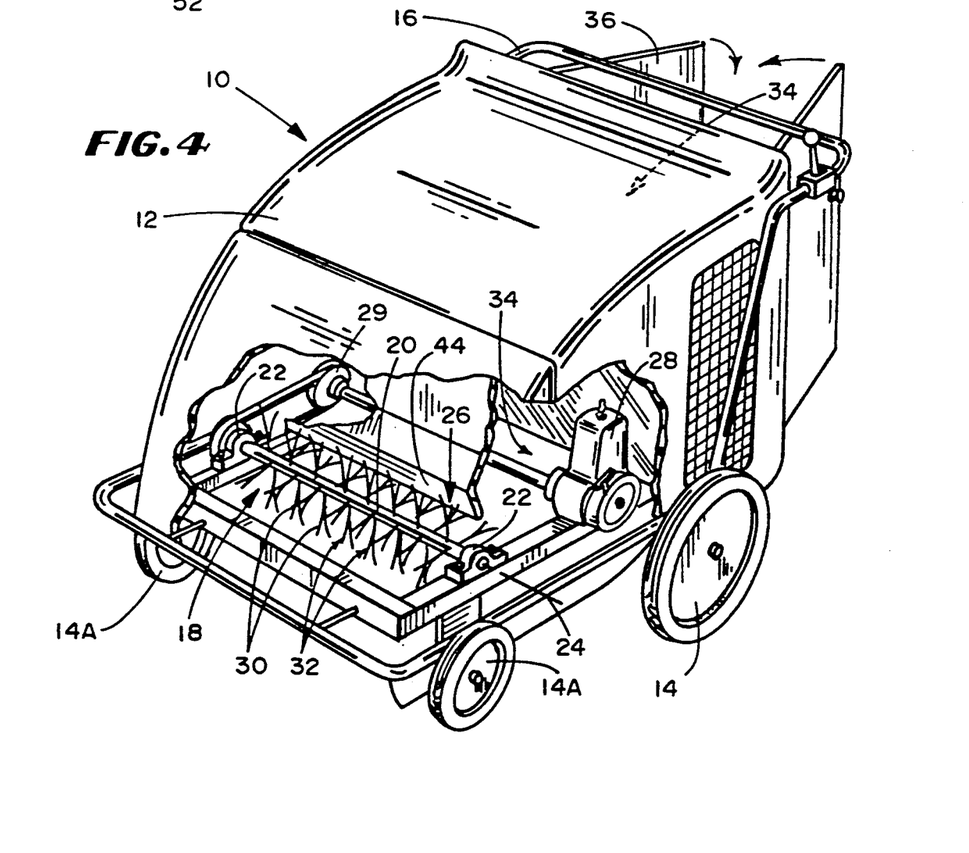
FIG. 4 is a perspective view of the front portion of the device shown in FIG. 1, with portions broken away to expose the interior.

As FIGS. 3 and 4 further show, the device 10 includes a striker assembly 18 for thrusting up materials from the ground for collection. In the illustrated embodiment, the materials are fallen leaves. Still, it should be appreciated that the striker assembly 18 can be used for other purposes. For example, the striker assembly 18 can be used to cut grass or to collect paper litter from the ground.

The striker assembly 18 includes a shaft 20 mounted across the front end of the housing 12. The shaft 20 rotates on bearings 22 (see FIG. 4) about a horizontal axis 24 at a predetermined distance above the ground. The shaft 20 extends lengthwise across the path of intended lateral movement of the housing 12. The shaft 20 is preferably made of rigid metal bar stock.

The striker assembly 18 includes an array of striker members 26 carried on the horizontal shaft 20 (see FIGS. 3 and 4). The striker members 26 are spaced apart along the rotational axis 24 of the shaft 20. The striker members 26 are also preferably arranged at arcuately spaced intervals about the rotational axis 24.

The device 10 includes an onboard power source 28 coupled to a belt drive unit 29 (see FIG. 4) for rotating the shaft 20, and with it, the striker members 26. In the illustrated embodiment, the power source 28 comprises a gasoline engine. The power source 28 also can include a transmission (not shown) for driving the rear wheels 14 of the device 10 to simplify handling by the user.

According to one aspect of my invention, each striker member 26 comprises a body 30 made of a nonrigid and preferably elastic plastic or metal rope material.

Figure 5:
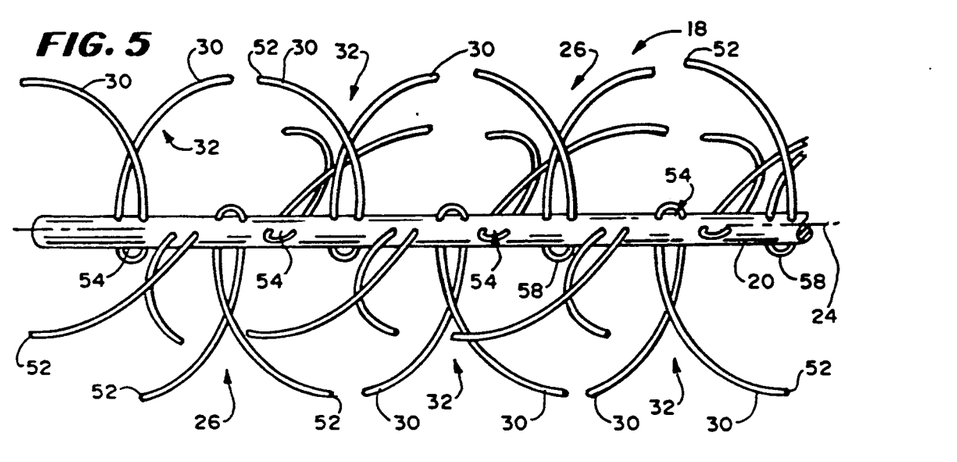
FIG. 5 is a perspective view of the striker assembly that the device shown in FIG. 1 incorporates, showing the striker assembly in its at rest position.

As FIG. 5 shows, the elastic, nonrigid striker bodies 30 are arranged upon the shaft 20 in spaced relationship along the rotational axis 24. In the illustrated and preferred embodiment, the striker bodies 30 are arranged in groups 32. The groups 32 are themselves spaced one from another at arcuate intervals about the rotational axis 24.

In the illustrated and preferred embodiment, there are two striker bodies 30 in each group 32. Adjacent groups 32 are spaced at arcuate intervals of about 90-degrees.

Figure 6:
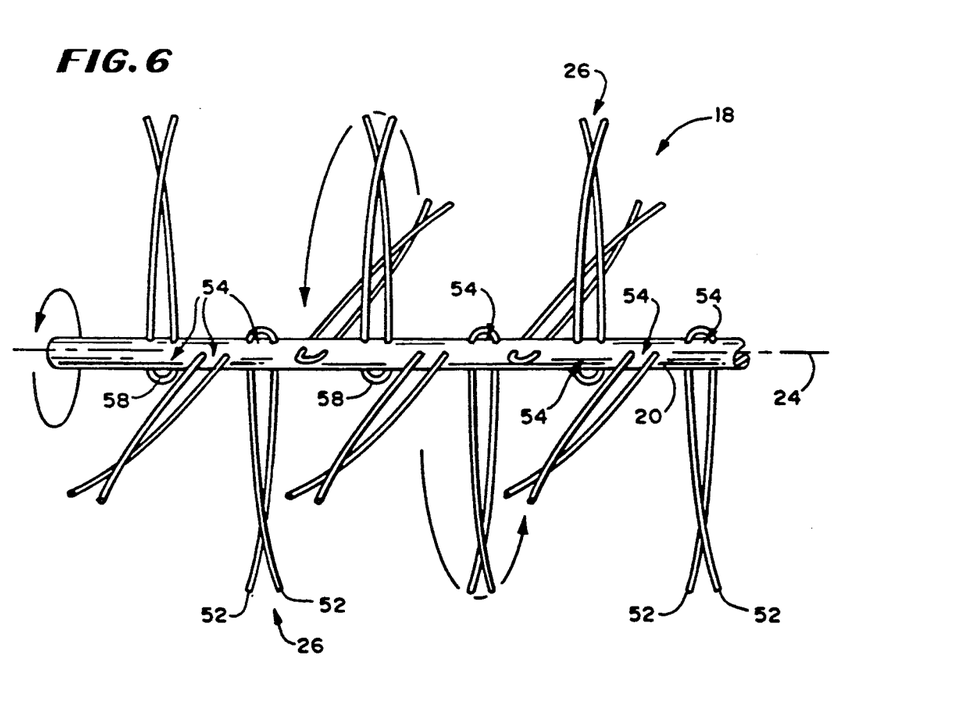
FIG. 6 is a perspective view of the striker assembly that the device shown in FIG. 1 incorporates, showing the striker assembly in its rotating working position.

The nonrigid striker bodies 30 normally assume an at rest position (as FIG. 5 shows) that differs from their at work position (as FIG. 6 shows). Being also elastic, when at rest, the striker bodies 30 randomly assume a variety of mutually nonaligned positions flexed out of a perpendicular relationship with the ground (as FIG. 5 shows).

As FIG. 6 shows, the normally flexed striker bodies 30 assume a different working position in response to rotation of the shaft 20. During rotation, centrifugal force acts to straighten out the striker bodies 30 in a unified fashion. In the presence of the centrifugal force, the striker bodies 30 extend from their mutually nonaligned rest positions radially out from the rotational axis 24 into a mutually aligned perpendicular relationship with the ground. When unified in this position, the striker bodies 30 cooperate to contact materials resting on the ground, thereby thrusting these materials up from the ground. As will be described later, when in their mutually aligned rotating position, the unified striker bodies 30 also serve to chop the materials as they are thrusted up from the ground.

In the illustrated and preferred embodiment (as FIG. 7 best shows), the device 10 includes walls that define an interior chamber 34 for collecting the materials thrusted and chopped by the striker assembly 18. A hinged rear door 36 permits access to the chamber for dumping the collected material.

Figure 7:
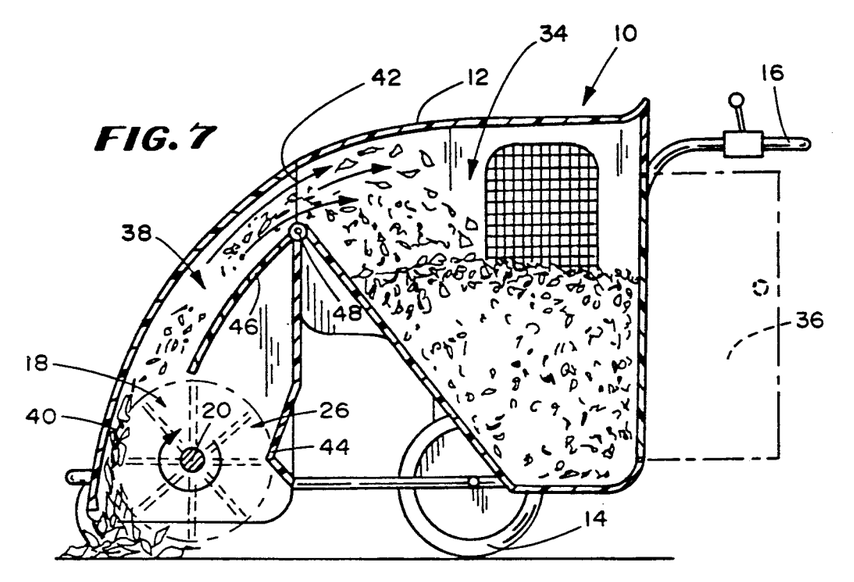
FIG. 7 is a side section view of the device shown in FIG. 1, showing the striker assembly in use picking up and chopping fallen leaves.

The device 10 also includes walls that define a chute 38. The chute 38 has an inlet 40 in the region of the striker assembly 18. A fixed deflector panel 44 is positioned on the side of the striker assembly 18 opposite from the chute inlet 40. The chute 38 also has an outlet 42 that leads to the collection chamber 34.

Figures 8, 9:
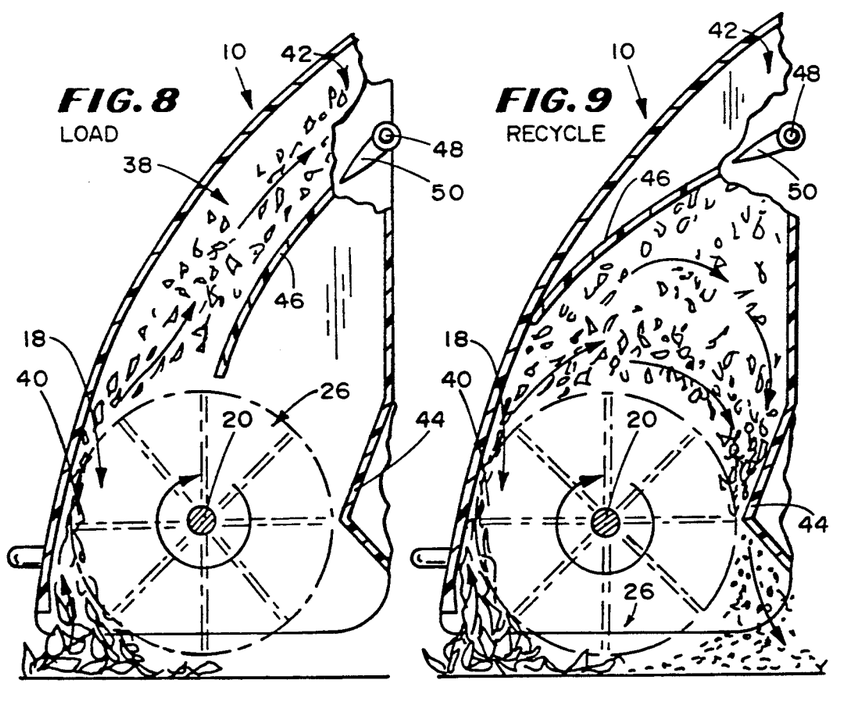
FIG. 8 is a side section view of the front end of the device shown in FIG. 1, with the collection chute in its open and load condition.
FIG. 9 is a side section view of the front end of the device shown in FIG. 1, with the collection chute is its closed and recycle condition.

As FIGS. 8 and 9 show, the device 10 includes a movable deflector panel 46. The movable deflector panel 46 is located within the chute 38 between its inlet 40 and its outlet 42. The deflector panel 46 is mounted on a hinge 48 for pivotal movement within the chute 38 between a retracted or load position (as FIG. 8 shows) and an extended or recycle position (as FIG. 9 shows).

When in its load position (also shown in FIG. 7 and in solid lines in FIG. 3), the panel 46 opens the chute outlet 42. The chute 38 directs material entering the chute inlet 40 into the collection chamber 34 (as FIGS. 7 and 8 show). When it is in its recycle position (also shown in phantom lines in FIG. 3), the panel 46 closes the chute outlet 42. The chute 38 recirculates material entering the chute inlet 40 back toward the region of the striker assembly 18 for additional contact with the striker bodies 30 and deposit on the ground (as FIG. 9 shows). An exposed handle 50 is attached to the panel 46 to allow the user to select the position of the deflector panel 46 to suit his/her intended mode of operation. When the handle 50 is positioned as shown in solid lines in FIG. 2, the panel 46 is in its load condition. When the handle 50 is positioned as shown in phantom lines in FIG. 2, the panel 46 is in its recycle condition.

In use (as FIGS. 7 to 9 show), the striker assembly 18 rotates against the direction of travel, which is clockwise in the illustrated embodiment. In this way, the striker assembly 18 sweeps the ground in the direction of forward travel. The spinning striker bodies 30 contact the fallen leaves in their path, thrusting them forward toward the chute inlet 40.

Preferably, when in their rotating working position, the distal ends 52 of the striker bodies 30 are located a short distance above the surface of the ground (see FIGS. 7 to 9). In this way, the unified, straightened striker bodies 30 hit the material directly, rather than first striking the grass or ground and being deflected. When the material is fallen leaves, the preferred above-ground distance is about ¼ inch.

I have found that the speed of rotation of the shaft 20 critically affects the alignment and striking force of the striker assembly 18 upon the material. Below a threshold RPM, there is not sufficient centrifugal force acting upon the striker bodies 30 to align them in a unified fashion in the desired working relationship perpendicular with the ground. However, once this lower RPM threshold is exceeded, enough centrifugal force develops to bring the mutually nonaligned striker bodies 30 into their unified working relationship. And, once this lower RPM threshold is exceeded, there is enough centrifugal force to return the individual bodies 30 back to the working position, should contact with the material force them out of their working position. In the unified working position that is established by centrifugal force, the individual spinning striker bodies 30 cooperate as a group to contact and thrust material up from the ground.

When in their working position, the rotating striker bodies 30 usually strike the material in their path one paired group 32 at a time. Upon contact with the striker group 32, the material will deflect either upwardly toward the chute inlet 40, or laterally off to one side, or perhaps in both directions. In any case, an adjacent striker group 32 will next contact the material, deflecting it again.

As a result, while within reach of the striker assembly 18, the striker groups 32 will usually strike and deflect the material repeatedly in rapid succession. After repeated strikes, the material will be eventually deflected out of the reach of the striker assembly 18 and into the upward regions of the chute 38. If the panel 46 is in its retracted position (as FIG. 8 shows), the material will proceed toward the chute outlet 42 and the collection chamber 34. If the panel 46 is in its extended position (as FIG. 9 shows), the material will recirculate back into the striker assembly 18 and will eventually fall to the ground.

As the speed of rotation increases above the lower operative threshold, the striking force of the bodies 30 intensifies. When a second, intermediate RPM threshold is reached, the striker bodies 30 impact the material with enough force to chop the materials into smaller pieces.

The degree to which the striker bodies 30 chop the material depends on the dryness or brittleness of the material and the number of times the striker bodies 30 contact the material per unit of time. The latter consideration is itself influenced by the relative spacing of the striker bodies 30 and the speed of rotation.

Above the second threshold RPM, the striker bodies 30 not only strike with enough force to break up material, but the high speed rotation of the striker bodies 30 also creates an air current in the region surrounding the striker assembly 18. When the panel 46 is in its retracted position (as FIG. 8 shows), the air currents assist in thrusting the chopped materials up the chute 38 for collection in the chamber 34. When the panel 46 is in its extended position (as FIG. 9 shows), the air currents assist in recirculating chopped materials back for additional chopping and deposit back onto the ground.

The chopping action and air flow velocity increase as the RPM increases above the second threshold. At an upper RPM limit, the chopping action and air flow velocity reach maximum effectiveness. Above this upper limit, further increases in RPM do not result in appreciable improvement in the chopping action and air flow velocity.

Various nonrigid elastic materials can be used as the striker members 26. For example, nylon line with a diameter in the range of about 0.105 to 0.130 inch can be used, as can steel rope with a diameter of about 0.187 inch. These materials have a flexural strength (or modulus) of between about 9000 and 17000 psi and a modulus of elasticity of about 200,000 psi. These materials are tough and durable. These materials are also relatively lightweight, making high speed rotation of the shaft 20 an achievable objective.

The length and spacing of the striker bodies 30 can vary, depending upon the diameter and strength the shaft 20, as well as the diameter and mass of the striker bodies 30 themselves. The objective is to avoid oscillation and the application of undue stress upon the shaft 20 during high speed rotation. When arranged in a rotationally balanced array (an example of which is shown in FIGS. 5 and 6), the relatively lightweight striker bodies 30 can be rotated at the high speeds where the desirable chopping action and air flow patterns are realized, without fatigue or undue stress to the shaft 20.

Nonrigid and elastic striker bodies 30 are preferred over striker bodies made of either rigid (that is, not flexible) or nonelastic material. Nonrigid, elastic striker bodies 30 are less likely of being permanently deformed or damaged in use. Nonrigid, elastic striker bodies 30 also yield immediately upon striking solid objects, thereby reducing vibration and damage to the shaft 20. The use of nonrigid striker bodies 30 also reduces the tendency to throw objects beyond the housing 12.

According to another aspect of my invention, the striker bodies 30 are mounted on the shaft 20 without using external fasteners. This aspect of my invention results in improved repair and maintenance. This aspect of my invention further lightens the load carried by the shaft 20, thereby making it possible to achieve the preferred high speeds of rotation.

Figure 10:
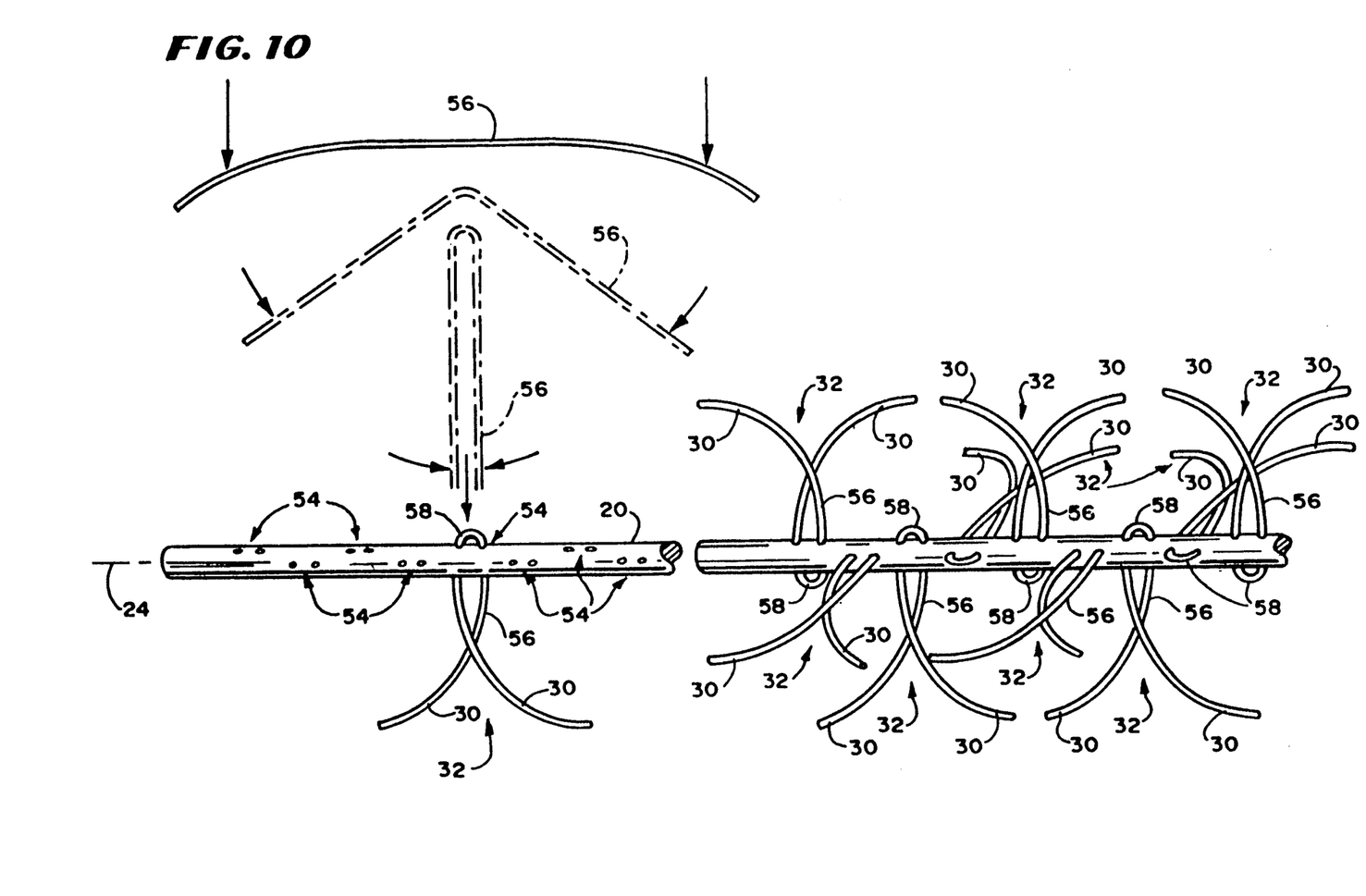
FIG. 10 is an exploded perspective view of a striker assembly that uses nonrigid, elastic striker members and that embodies aspects of my invention.

As FIG. 10 best shows, the shaft 20 includes a series of adjacent pairs 54 of holes. Each hole in the pair 54 extends radially through the rotational axis 24. Each individual pair 54 is adjacently spaced along the rotational axis 24. Adjacent pairs 54 are also arcuately spaced about the rotational axis 24 at ninety degree intervals.

In this arrangement, each striker group 32 is formed using a single member 56. The member 56 is bent upon itself into a U-shape and passed through an adjacent pair 54 of holes. The bent single member 56 thereby forms one striker group 32 having two striker bodies 30, as previously described.

As previously described, the striker member 56 preferably takes the form of a length of elastic, nonrigid plastic or metal material that is bent upon itself into the U-shape and inserted by the user through an adjacent pair 54 of holes. When bent, the elastic memory of the member 56 normally urges the two legs (that is, the paired striker bodies 30) apart. The elastic memory of the bent member 56 thereby holds the striker group 32 in place on the shaft 20 without the use of external fasteners.

When the shaft 20 is rotated, the centrifugal force straightens each striker group 32 into the previously described working relationship (as FIG. 6 shows). Simultaneously, the centrifugal force also draws the bend 58 of the bent U-shaped member 56 into the shaft 20. This action further secures the striker group 32 on the shaft 20 without using external fasteners.

Figure 10A:
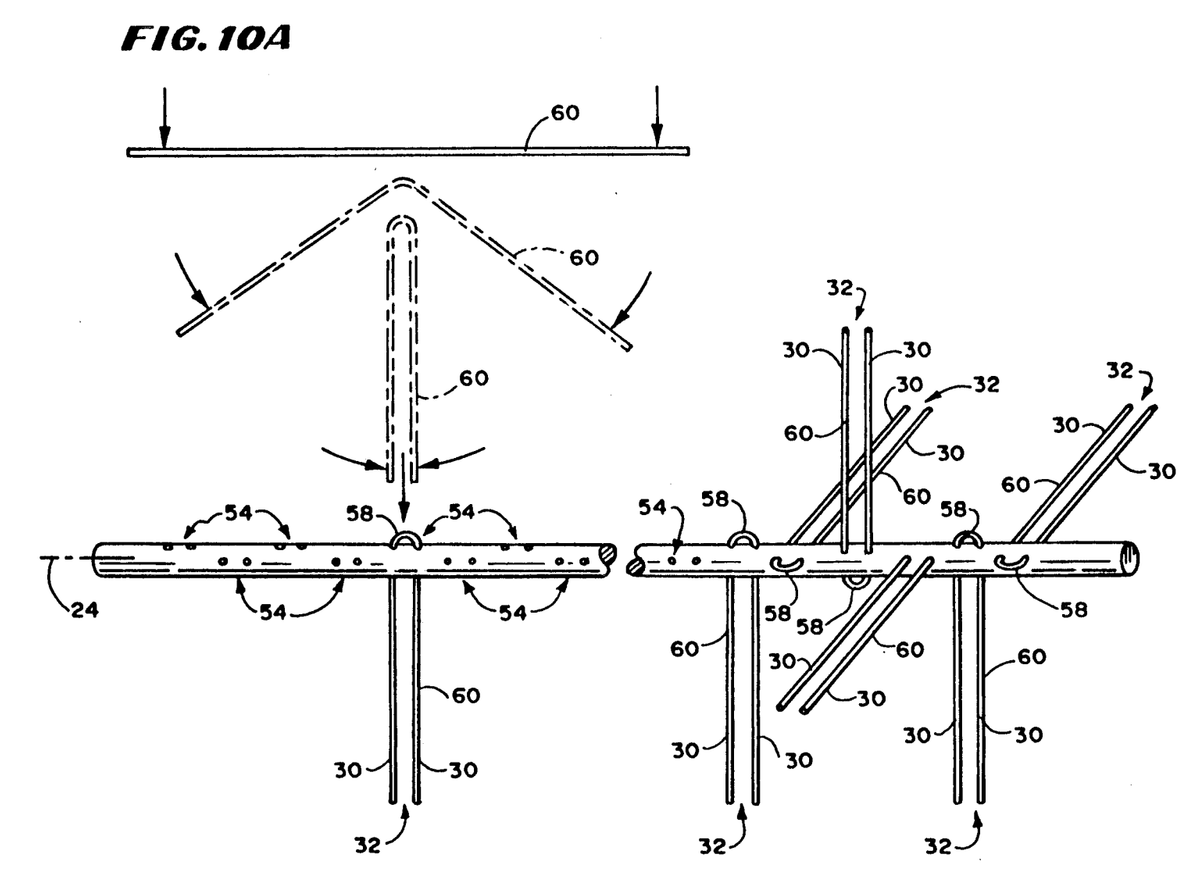
FIG. 10A is an exploded perspective view of an alternate striker assembly that uses rigid, deformable striker members and that embodies aspects of my invention.

Alternately (as FIG. 10A shows), the striker member 60 can take the form of a length of nonelastic but otherwise bendable rigid or semirigid plastic or metal material. As previously described, the deformable striker member 60 is bent upon itself into the U-shape and inserted through an adjacent pair 54 of holes. In this arrangement, the centrifugal force of rotation holds each bent striker member 26 in place without bolts or other fasteners, in the manner previously described.

The spacing within and between the pairs 54 of holes along the shaft 20 will vary according to the characteristics of the materials used. It is important that the material is not bent beyond its elastic range or is otherwise crimped while forming the U-shape. Using elastic nylon line or steel rope, as above described, the elastic locking effect worked well at a spacing of about 0.5 inch between the holes of each pair 54. Each pair 54 in turn can be spaced about one inch apart.

The following example shows the features and benefits of my invention in collecting and chopping fallen leaves.

EXAMPLE

The device as generally described above was used to collect and chop fallen leaves in the springtime (April). The fallen leaves had been covered by deep snow all winter. When collected, the top layer of the leaves was dry, but the bottom layers of leaves were still either damp or wet and matted.

The device used had a rolled steel shaft with a width of 28 inches and a rotating diameter of 14 inches. The shaft was powered by a 5 HP engine. The striker assembly comprised 22 striker groups 32 each formed of 0.105 or 0.130 inch nylon line bent upon itself to form two striker bodies 30 in the manner just described. The striker groups 32 were spaced one inch apart and staggered at 90 degree intervals (as FIG. 5 shows).

Each striker body 30 had an extended working length of about 7 inches. When rotated and in its working position, the striker assembly 18 assumed a full sweep out diameter of about 14 inches (as FIG. 6 shows). As this example shows, the 7 inch striker bodies 30 were rotated at speeds more than 3000 RPM with no indication of stress or fatigue to the shaft.

Figure 11:
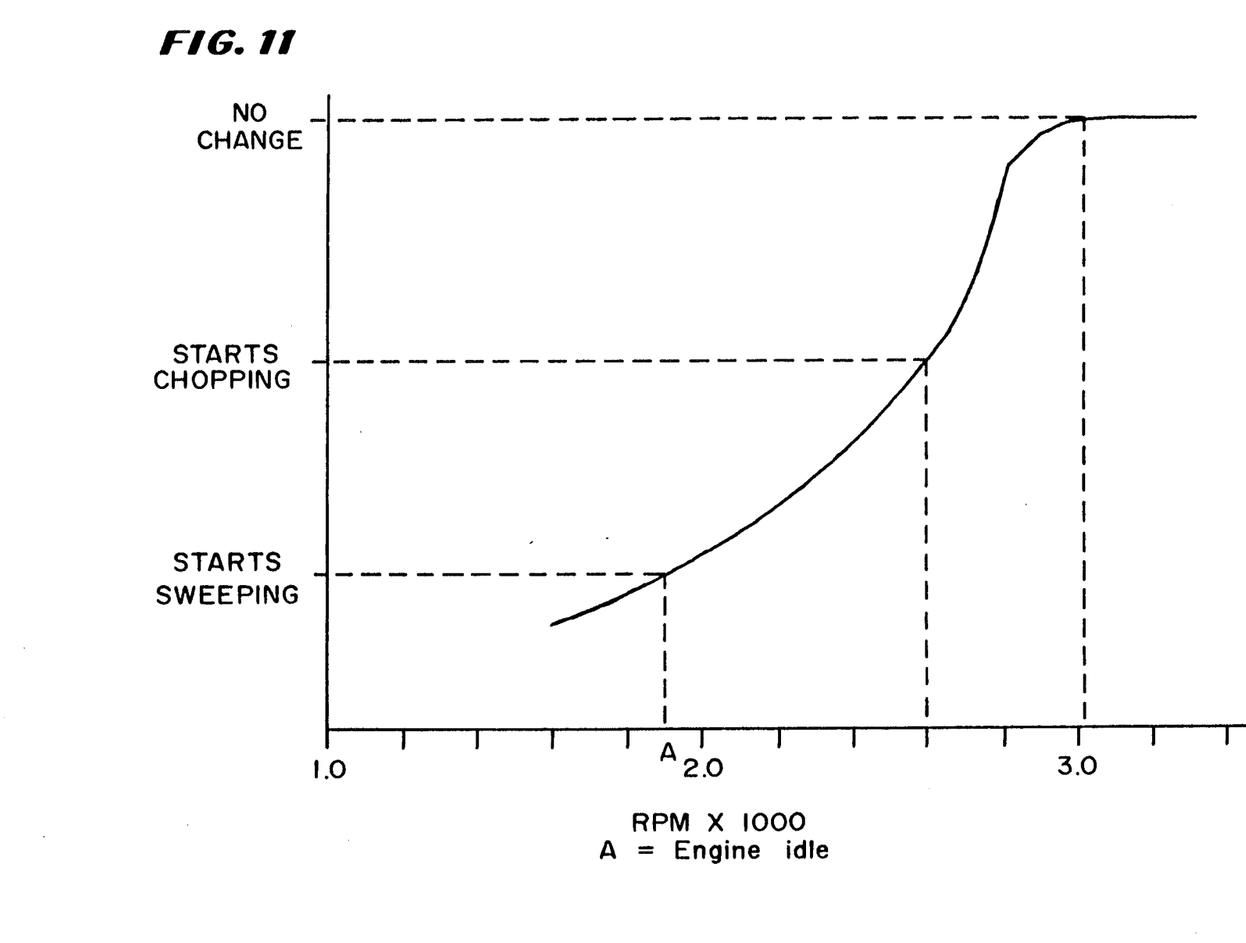
FIG. 11 is a chart showing the relationship between the speed of operating the striker assembly and its effectiveness of operation.

The performance of the device 10 was observed at varying speeds of shaft rotation. FIG. 11 summarizes the results.

The device 10 was pushed by a user at a lateral speed of about 2 ft/sec to 4 ft/sec. When the shaft 20 was rotated at an idle speed of about 1900 RPM's, the device 10 did not sweep up appreciable amounts of leaves. Large clusters of leaves would also kill the idling engine.

When the shaft 20 was rotated above about 1900 RPM, the striker assembly 18 began to efficiently pick up leaves. Its pick up efficiency (measured in terms of leaves picked up relative to the total amount of leaves exposed to the striker assembly 18) steadily increased with increasing shaft RPM.

At a shaft velocity of about 2600 RPM, the striker assembly 18 also began chopping the leaves. The efficiency of chopping increased (measured in terms of the size of the leaves after chopping) as shaft RPM increased up to about 3000. Although the shaft was rotated at speeds up to 3400 RPM, no appreciable change in sweeping and chopping efficiencies were observed at speeds above 3000 RPM.

At a shaft velocity of 3000 RPM, a striker group 32 passed the same point 50 times a second. The velocity of the distal ends 52 of each striker group 32 was 183 ft/secs. At 183 ft/secs, the striker assembly 18 struck leaves with enough force to chop the leaves to reduce their volume about 6 to 8 times, creating a fine mulch suitable for compost. The air current created was sufficient to easily carry the chopped leaves up at least 48 inches, forcing the chopped leaves into the chute and collection chamber.

As the above example shows, the striker assemblies 18 that embody the features of my invention are lightweight, yet tough and durable. They can be rotated at relatively high speeds for chopping material without stressing or damaging conventional power units. The striker assemblies that incorporate my invention are also easy to maintain and service.

The features of my invention are set forth in the following claims.

I claim:
1. A powered striker assembly for collecting loose material on the ground comprising
   a shaft mounted for rotation about a horizontal axis at a predetermined distance above the ground, and
   an array of striker members carried on the horizontal shaft, the striker members comprising nonrigid bodies that, in response to centrifugal force generated by rotation of the shaft above a threshold speed, assume a mutually aligned perpendicular relationship with the ground for contacting and thrusting loose material, the nonrigid bodies assuming a different, at rest position in the absence of shaft rotation.
2. A striker assembly according to claim 1
   wherein the bodies of the striker members are elastic and, in the absence of shaft rotation, are normally flexed out of a perpendicular relationship with the ground, the flexed striker bodies being straightened out in response to the centrifugal force into the generally mutually aligned perpendicular relationship with the ground.

3. A striker assembly according to claim 1 wherein the array of striker bodies are spaced along the axis of rotation.

4. A striker assembly according to claim 3 wherein the striker bodies are also arcuately spaced about the axis of rotation.

5. A striker assembly according to claim 1 wherein the shaft includes an adjacent pair of holes extending through the shaft, and
wherein the array of striker members includes a length of nonrigid line that is bent upon itself into a U-shape and that extends through the holes to form a striker unit comprising two adjacent striker bodies.

6. A striker assembly according to claim 5 wherein the shaft includes a second adjacent pair of holes extending through the shaft axially spaced from the first adjacent pair of holes, and
wherein the array of striker members includes a striker unit associated with each adjacent pair of holes, each striker unit comprising a length of nonrigid line bent upon itself into a U-shape and extending through the associated holes.

7. A striker assembly according to claim 6 wherein the first pair of adjacent holes is arcuately spaced about the axis of rotation from the second pair of adjacent holes.

8. A striker assembly according to claim 1 wherein at least some of the nonrigid striker bodies are made of a plastic material.

9. A striker assembly according to claim 1 wherein at least some of the nonrigid striker bodies are made of a metal rope material.

10. A striker assembly according to claim 1 and further including power means for rotating the shaft at a velocity above about 1000 RPM.

11. A striker assembly according to claim 12 wherein the power means rotates the shaft at a velocity about 2000 RPM.

12. A striker assembly for collecting loose material on the ground comprising,
a shaft mounted for rotation about a horizontal axis at a predetermined distance above the ground,
mounting means defining an adjacent pair of through holes in the shaft, the holes being aligned along the axis of rotation of the shaft, and
striker means including a body that is bent upon itself into a U-shape and that extends through the adjacent holes to form a striker unit comprising two striker bodies.

13. A striker assembly according to claim 12 wherein the mounting means includes a second pair of adjacent through holes in the shaft axially spaced from the first adjacent pair of through holes, and
wherein the striker means includes a striker unit associated body associated with each adjacent pair of holes, each striker unit comprising a body that is bent upon itself into a U-shape and that extends through the associated hole to form two striker bodies.

14. A striker assembly according to claim 13 wherein the first adjacent pairs of through holes is arcuately spaced about the axis of rotation from the second pair of adjacent through holes 15. A striker assembly according to claim 14 wherein the shaft includes a series of adjacent pairs of through holes, and
wherein the striker means includes a body associated with each adjacent pair of holes, each body being bent upon itself into a U-shape and extending through the associated pair of holes to form a striker unit.

16. A striker assembly according to claim 15 wherein each pair of through holes is arcuately spaced about the axis of rotation from the next adjacent pair of through holes.

17. A striker assembly according to claim 12 wherein the striker body is made from a plastic material.

18. A striker assembly according to claim 17 wherein the striker body is nonrigid.

19. A striker assembly according to claim 18 wherein the striker body is elastic.

20. A striker assembly according to claim 12 wherein the striker body is made from a metal material.

21. A striker assembly according to claim 20 wherein the striker body is nonrigid.

22. A striker assembly according to claim 21 wherein the striker body is elastic.

23. A device for collecting fallen leaves comprising
a housing resting on wheels for lateral movement along the ground, and
a striker assembly comprising,
a shaft mounted on the housing for rotation about a horizontal axis, the shaft extending lengthwise across the path of lateral movement at a predetermined distance above the ground,
an array of strikers carried in spaced-apart relationship on the horizontal shaft, the strikers each comprising an elastic nonrigid body that, in the absence of shaft rotation, is normally flexed toward in a nonperpendicular relationship with the ground, the normally flexed striker bodies being straightened out into a mutually perpendicular relationship with the ground in response to centrifugal force for contact with fallen leaves in the path of lateral movement of the housing, and
power means for rotating the shaft to develop a centrifugal force sufficient to maintain the strikers in their mutual perpendicular relationship.

24. A device according to claim 23 wherein the housing includes walls defining a collection chamber and walls defining a chute having an inlet end enclosing the striker assembly and an outlet end leading into the collection chamber for conveying leaves contacted by the striker bodies into the collection chamber.

25. A device according to claim 24 wherein the housing includes deflector means movable within in the chute between a retracted position opening the chute outlet end and an extended position within the chute closing the chute outlet end.

26. A striker assembly according to claim 23 wherein the striker bodies are spaced both axially along the rotational axis and arcuately about the rotational axis.

27. A striker assembly according to claim 24 wherein the shaft includes a series of adjacent pair of holes extending through the shaft, and wherein the array of striker members includes a length of elastic nonrigid line associated with each adjacent pair of holes, each line being bent upon itself into a U-shape and extending through the associated holes to form a striker unit comprising two adjacent striker bodies.

28. A striker assembly according to claim 24 wherein at least some of the elastic nonrigid striker bodies are made of a plastic material.

29. A striker assembly according to claim 24 wherein at least some of the elastic nonrigid striker bodies are made of a metal material.

30. A device for collecting fallen leaves comprising
a housing resting on wheels for lateral movement along the ground, and
a striker assembly comprising,
  a shaft mounted on the housing for rotation about a horizontal axis, the shaft extending lengthwise across the path of lateral movement at a predetermined distance above the ground,
mounting means defining a series of adjacent pairs of through holes in the shaft, the holes being aligned along the axis of rotation of the shaft, and
striker means including a body associated with each adjacent pair of holes, each body being bent upon itself into a U-shape that extends through the adjacent holes to form a striker unit comprising two striker bodies, and
power means for rotating the shaft to bring the striker bodies into contact with fallen leaves on the ground.

31. A device according to claim 30 wherein the housing includes walls defining a collection chamber and walls defining a chute having an inlet end enclosing the striker assembly and an outlet end leading into the collection chamber for conveying leaves contacted by the striker bodies into the collection chamber.

32. A device according to claim 31 wherein the housing includes deflector means movable within in the chute between a retracted position opening the chute outlet end and an extended position within the chute closing the chute outlet end.

33. A device according to claim 30 wherein each pair of through holes is arcuately spaced about the axis of rotation from the next adjacent pair of through holes.

34. A device according to claim 30 wherein at least some of the striker bodies are made of an elastic plastic material.

35. A device according to claim 30 wherein at least some of the striker bodies are made of an elastic metal material.

36. A method for collecting loose material on the ground comprising
placing an array of strikers on a horizontal shaft, the strikers each comprising an elastic nonrigid body that is normally flexed out of a perpendicular relationship with the ground, the flexed striker bodies being straightened out in response to centrifugal force into a generally perpendicular mutually aligned relationship with the ground, and
rotating the shaft at a velocity sufficient to develop the centrifugal force to straighten the flexed striker bodies into their generally perpendicular relationship with the ground to contact and thrust loose material, and
moving the rotating shaft and, with it, the striker bodies laterally over the ground.

37. A method according to claim 36 and further including the step of
rotating the shaft at a velocity above about 2000 RPM to chop the thrusted material.

38. A method for collecting loose material on the ground comprising
placing an array of strikers on a horizontal shaft, the strikers each comprising a nonrigid body that, in response to centrifugal force, assume a generally perpendicular mutually aligned relationship with the ground and that, in the absence of the centrifugal force assume a different, at rest relationship with the ground,
rotating the shaft at a velocity sufficient to develop the centrifugal force to move the striker bodies into their generally perpendicular relationship with the ground to contact and thrust loose material, and
moving the rotating shaft and, with it, the striker bodies laterally over the ground.

* * * * *